(12) United States Patent
Shim et al.

(10) Patent No.: US 9,604,605 B2
(45) Date of Patent: Mar. 28, 2017

(54) HYBRID ELECTRO-MECHANICAL BRAKE AND SYSTEM HAVING THE SAME

(71) Applicant: Hyundai Motor Company, Seoul (KR)

(72) Inventors: Jae Hun Shim, Hwaseong-si (KR); Sang Hyun Shim, Seoul (KR); Joung Hee Lee, Suwon-si (KR); Gab Bae Jeon, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 14/871,538

(22) Filed: Sep. 30, 2015

(65) Prior Publication Data

US 2016/0137181 A1    May 19, 2016

(30) Foreign Application Priority Data

Nov. 18, 2014  (KR) .................. 10-2014-0160850

(51) Int. Cl.
    *F16D 65/18*    (2006.01)
    *B60T 7/04*     (2006.01)
    (Continued)

(52) U.S. Cl.
    CPC ............ B60T 7/042 (2013.01); B60T 13/588 (2013.01); B60T 13/686 (2013.01);
    (Continued)

(58) Field of Classification Search
    CPC ............. F16D 65/0006; F16D 65/0971; F16D 2121/04; F16D 2121/24; F16D 2125/06; F16D 2125/40
    See application file for complete search history.

(56) References Cited

U.S. PATENT DOCUMENTS 3,788,430 A * 1/1974 Hurt .................. F16D 65/18
                                                188/106 F
5,348,123 A * 9/1994 Takahashi ............. B60T 7/04
                                                188/162
(Continued)

FOREIGN PATENT DOCUMENTS

JP    2007-519568 A    7/2007
JP    2013-224128 A    10/2013
(Continued)

*Primary Examiner* — Bradley King
(74) *Attorney, Agent, or Firm* — McDermott Will & Emery LLP (57) ABSTRACT

A hybrid electro-mechanical brake (EMB) includes an actuator mounted at one side of a housing and generating a motor clamping force. A primary piston is connected to a spindle, which rotates by a motor clamping force of the actuator, to linearly move when the spindle rotates. A secondary piston linearly moves and is mounted between the housing and the primary piston to form a hydraulic chamber between the second piston and the primary piston. The hybrid EMB system generates a brake force by using the motor clamping force of the actuator and a hydraulic pressure in a hydraulic chamber. The actuator actuates to move the primary piston toward a front end of the secondary piston to increase a pressure in the hydraulic chamber, which is sealed, so that the brake force transferred to the secondary piston increases.

5 Claims, 9 Drawing Sheets (51) Int. Cl.
- *B60T 13/68* (2006.01)
- *B60T 13/58* (2006.01)
- *B60T 13/74* (2006.01)
- *F16D 121/24* (2012.01)
- *F16D 121/04* (2012.01)
- *F16D 65/097* (2006.01)

(52) U.S. Cl.
CPC ........ *B60T 13/741* (2013.01); *F16D 65/0971* (2013.01); *F16D 2121/04* (2013.01); *F16D 2121/24* (2013.01)

(56) References Cited

U.S. PATENT DOCUMENTS

| | | | | |
|---|---|---|---|---|
| 5,682,965 A | * | 11/1997 | Prinzler | B60T 13/745 188/158 |
| 5,782,322 A | * | 7/1998 | Hauck | F16D 65/18 188/162 |
| 5,788,023 A | * | 8/1998 | Schoner | F16D 65/00 188/158 |
| 6,158,557 A | * | 12/2000 | Leitermann | F16D 65/14 188/162 |
| 6,405,836 B1 | * | 6/2002 | Rieth | F16D 65/18 188/158 |
| 6,457,783 B1 | * | 10/2002 | Schanzenbach | B60T 13/745 188/156 |
| 6,837,342 B1 | * | 1/2005 | Olschewski | F16D 55/228 188/72.5 |
| 7,156,212 B1 | * | 1/2007 | Ciotti | F16D 55/228 188/72.4 |
| 8,453,803 B2 | * | 6/2013 | Cho | B60T 8/326 188/156 |
| 2006/0289255 A1 | * | 12/2006 | Adams | F16D 65/0006 188/218 XL |
| 2012/0152664 A1 | * | 6/2012 | Crippa | F16D 65/0018 188/72.4 |
| 2013/0327606 A1 | * | 12/2013 | Platzer | F16D 65/0006 188/368 |
| 2015/0114769 A1 | * | 4/2015 | Kim | F16D 65/18 188/72.4 |
| 2016/0144842 A1 | * | 5/2016 | Jeon | B60T 13/741 303/15 |

FOREIGN PATENT DOCUMENTS

| | | |
|---|---|---|
| JP | 2013-244888 A | 12/2013 |
| JP | 5407996 B2 | 2/2014 |
| JP | 2014-069739 A | 4/2014 |
| KR | 10-2007-0002215 A | 1/2007 |
| KR | 10-2008-0012468 A | 2/2008 |
| KR | 10-2011-0026587 A | 3/2011 |

\* cited by examiner

--PRIOR ART--

HYBRID ELECTRO-MECHANICAL BRAKE AND SYSTEM HAVING THE SAME

CROSS-REFERENCE TO RELATED APPLICATION

This application claims under 35 U.S.C. §119(a) the benefit of priority to Korean Patent Application No. 10-2014-0160850 filed on Nov. 18, 2014, the entire content of which is incorporated herein by reference.

TECHNICAL FIELD

The present disclosure relates to a hybrid electro-mechanical brake (EMB). More particularly, the present disclosure relates to a hybrid EMB and a system having the hybrid EMB for securing brake force and securing deterioration durability when switching to a brake mode.

BACKGROUND

A hybrid electro-mechanical brake (EMB) system of a vehicle generates a brake force by applying a motor clamping force of an actuator and a hydraulic pressure of a brake oil from a hydraulic apparatus.

Figure 8:
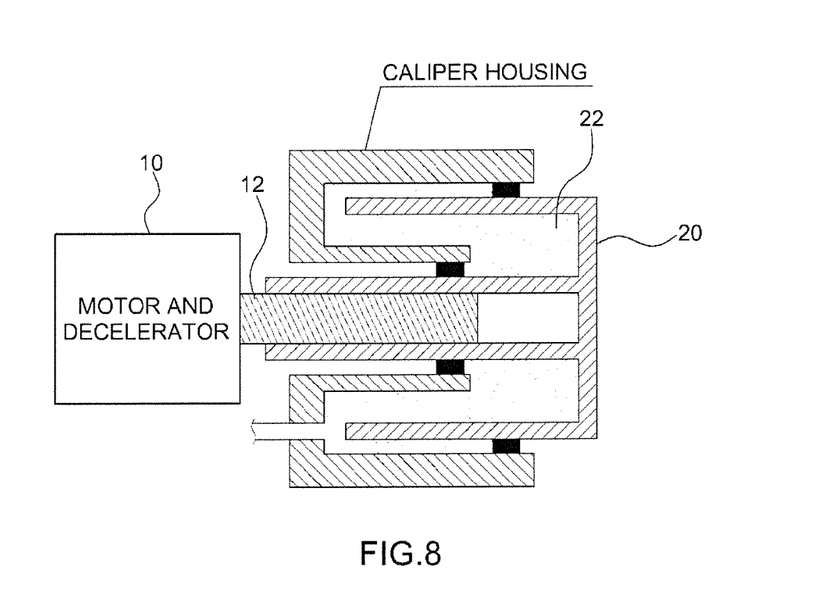
FIG. 8 is a diagram for describing an actuation mechanism of a hybrid EMB in the related art.

FIG. 8 is a diagram for describing an actuation mechanism of a hybrid EMB in a related art.

Referring to FIG. 8, a hybrid EMB in the related art comprises a spindle 12 rotating by a motor clamping force of an actuator (a motor and a decelerator) 10, a piston 20 moving forward by a brake oil supplied to a hydraulic chamber 22 in the piston 20 from outside. Thus, the piston 20 moves forward by the motor clamping force and a hydraulic pressure formed in the hydraulic chamber 22 to generate a brake force.

The brake force of the hybrid EMB in the related art is not generated by the hydraulic pressure formed in the hydraulic chamber, but is generated only by the motor clamping force. Such a brake force generated only by the motor clamping force is not sufficient for a large-sized vehicle.

That is, the hybrid EMB according to the related art cannot be applied to the large-sized vehicle due to the insufficient brake force (motor torque).

The above information disclosed in this Background section is only for enhancement of understanding of the background of the disclosure, and therefore, it may include information that does not form the prior art that is already known in this country to a person of ordinary skill in the art.

SUMMARY OF THE DISCLOSURE

The present disclosure has been made in an effort to solve the above problem. An aspect of the present inventive concept provides a hybrid EMB which can increase a brake force by a motor clamping force and a hydraulic force generated in a hydraulic chamber which is formed between a primary piston and a secondary piston, and continuously maintain an appropriate gap between the primary piston and the secondary piston at the time of changing a brake mode.

According to an exemplary embodiment of the present inventive concept, a hybrid electro-mechanical brake (EMB) includes an actuator mounted at one side of a housing and generating a motor clamping force. A primary piston is connected to a spindle, which rotates by the motor clamping force of the actuator and linearly moving when the spindle rotates. A secondary piston linearly moves and is mounted between the housing and the primary piston to form a hydraulic chamber between the second piston and the primary piston. The hybrid EMB generates a brake force by using the motor clamping force of the actuator and a hydraulic pressure in a hydraulic chamber. The actuator actuates to move the primary piston toward a front end of the secondary piston to increase a pressure in the hydraulic chamber, so that the brake force transferred to the secondary piston increases.

The brake force transferred to the secondary piston may be generated proportional to an area ratio of the primary piston and the secondary piston and may be calculated by the following equation:

motor clamping force of actuator*(area of front end of secondary piston/area of front end of primary piston).

The hybrid EMB may further include a reaction damper disposed inside the secondary piston at the front end thereof between the primary piston and the secondary piston and transferring the motor clamping force and the pressure in the hydraulic chamber.

The reaction damper may include an external outer member made of rubber so that when the primary piston moves toward the secondary piston, the motor clamping force is converted into the pressure in the hydraulic chamber by elasticity. An internal inner member is made of steel to prevent excessive deformation of the reaction damper. A joining protrusion may by inserted and fixed into an inner wall surface of the front end of the secondary piston, and protrude on an outer peripheral surface of the outer member in order to increase mountability in the secondary piston.

According to another exemplary embodiment of the present inventive concept, a hybrid EMB system includes a hybrid EMB generating a brake force together with a hydraulic apparatus. A wheel control unit (WCU) is configured to control the hybrid EMB. A solenoid valve opens and closes a hydraulic line between the hydraulic apparatus and the hybrid. The hybrid EMB includes an actuator mounted at one side of a housing and generating a motor clamping force. A primary piston is connected to a spindle, which rotates by a motor clamping force of the actuator, to linearly move when the spindle rotates. A secondary piston linearly moves and is mounted between the housing and the primary piston to form a hydraulic chamber between the second piston and the primary piston.

According to a hybrid EMB of the present disclosure, the following effect can be achieved.

1. Brake force is increased with hydraulic force by an area ratio of a primary piston and a secondary piston to secure the brake force applicable to a large-sized vehicle.
2. When a parking brake mode is changed to a main brake mode, a brake sense of difference can enhanced and a stable brake sense can be secured.
3. Stable hydraulic pressure can be formed and maintained between the primary piston and the secondary piston to enhance deterioration durability at the time of switching a brake mode depending on a durability progress of a vehicle.

Other aspects and exemplary embodiments of the inventive concept are discussed infra.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (for example, fuels derived from resources other than petroleum). As referred to herein, a hybrid vehicle is a vehicle that has two or more sources of power, for example both gasoline-powered and electric-powered vehicles.

BRIEF DESCRIPTION OF THE DRAWINGS

The above and other features of the present inventive concept will now be described in detail with reference to certain exemplary embodiments thereof illustrated in the accompanying drawings which are given hereinbelow by way of illustration only, and thus are not limitative of the present disclosure.

It should be understood that the appended drawings are not necessarily to scale, presenting a somewhat simplified representation of various features illustrative of the basic principles of the inventive concept. The specific design features of the present inventive concept as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present inventive concept, examples of which are illustrated in the accompanying drawings and described below. While the disclosure will be described in conjunction with exemplary embodiments, it will be understood that present description is not intended to limit the inventive concept to those exemplary embodiments. On the contrary, the disclosure is intended to cover not only the exemplary embodiments, but also various alternatives, modifications, equivalents, and other embodiments, which may be included within the spirit and scope of the disclosure as defined by the appended claims.

Hereinafter, the present disclosure will be described with reference to the accompanying drawings so that those skilled in the art can easily perform the present disclosure.

Figure 1:
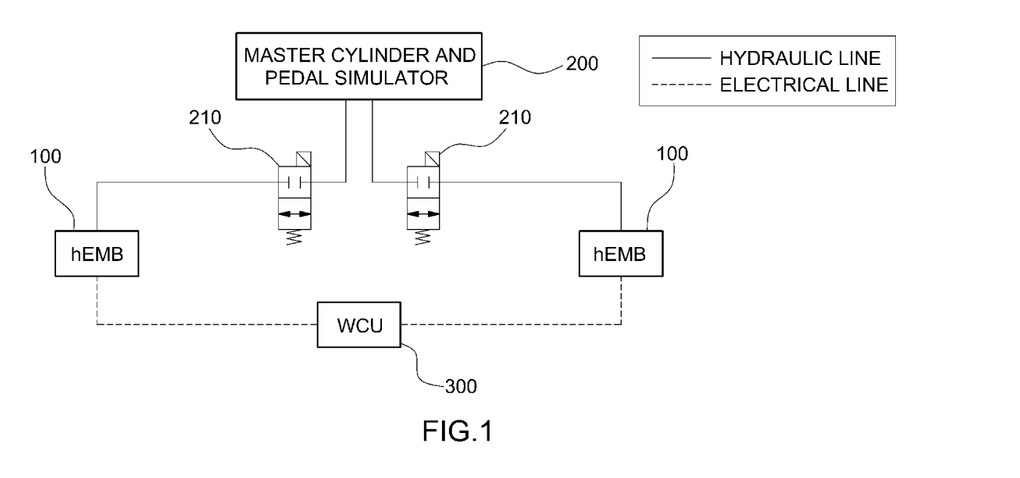
FIG. 1 is a configuration diagram illustrating a hybrid EMB system according to the present disclosure.

Referring to FIG. 1, a hybrid EMB system includes a hybrid electro-mechanical brake (EMB) 100 generating a brake force together with a hydraulic apparatus 200. The hydraulic apparatus 200 is constituted by a pedal simulator forming a pedal sense when a driver requests braking by stepping on a brake pedal and a master cylinder forming a hydraulic line with the hybrid EMB by a converting force (step force) to step on the brake pedal into a hydraulic pressure. A wheel control unit (WCU) 300 controls overall actuation of the hybrid EMB 100. A solenoid valve 210 opens/closes a flow path (hydraulic line) between the hydraulic apparatus and the hybrid EMB 100.

Figure 2A:
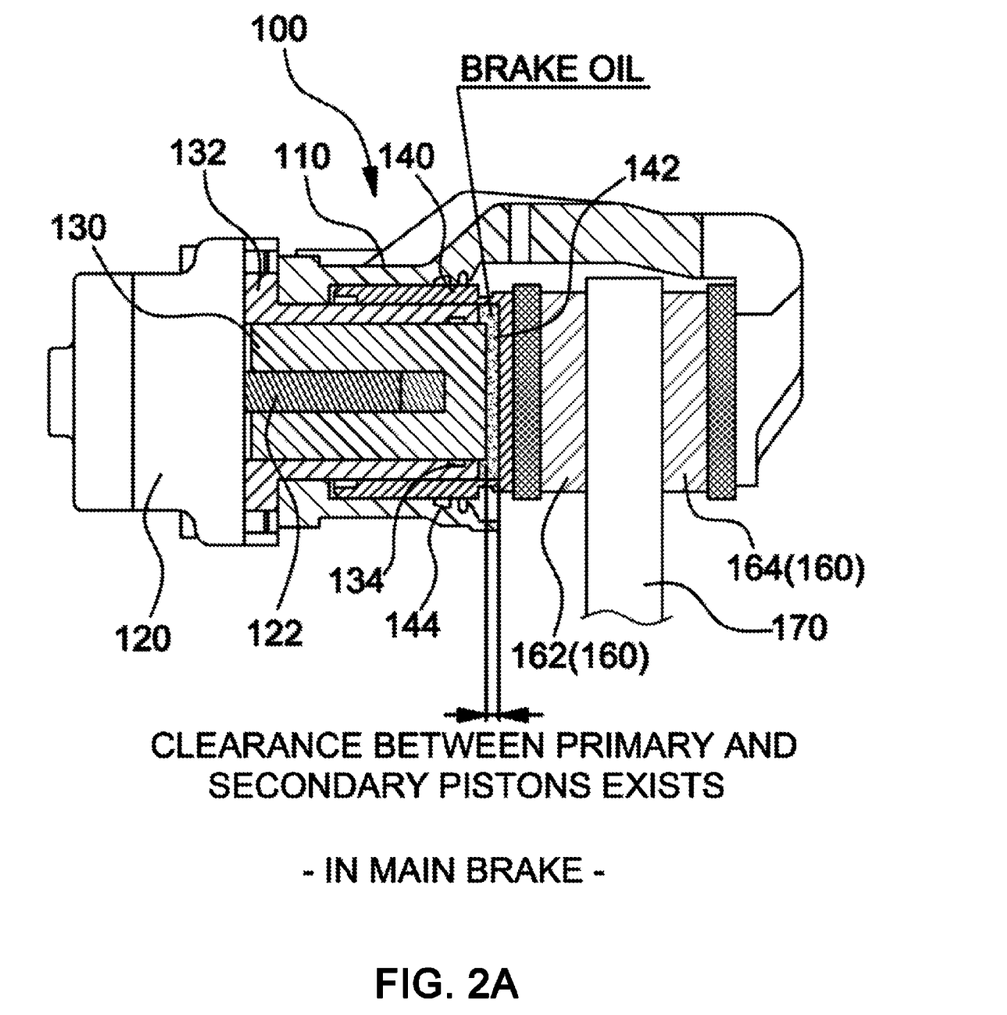
FIGS. 2A and 2B are configuration diagrams illustrating a hybrid EMB in a main brake mode and a parking brake mode, respectively, according to an embodiment of the present inventive concept.
Figure 2B:
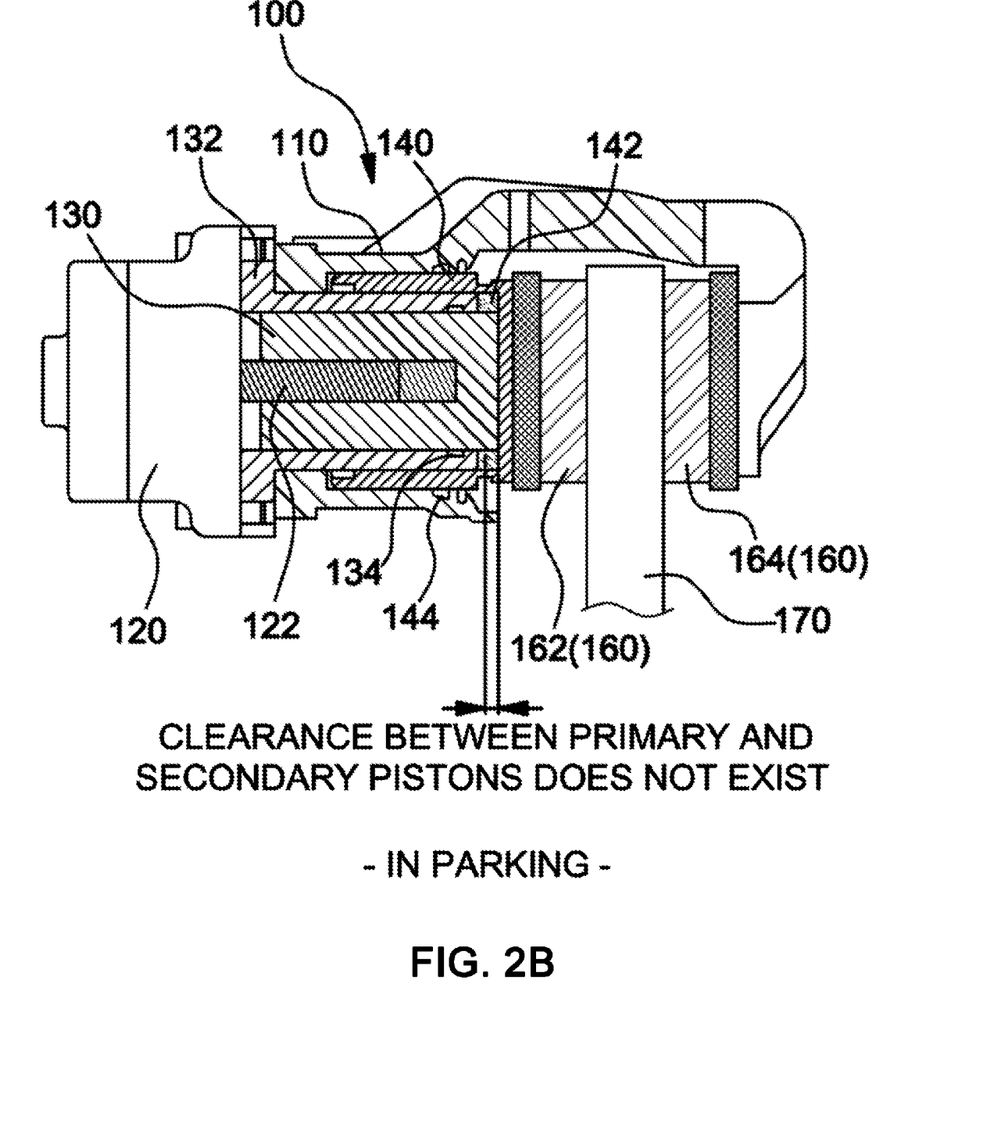

The hybrid EMB system provides a high brake force by a motor clamping force and the hydraulic pressure in the hydraulic chamber. As illustrated in FIGS. 2A and 2B, the hybrid EMB 100 generates the brake force by using the motor clamping force generated by actuating an actuator 120 mounted at one side of a housing 110 and the hydraulic pressure transferred (provided) in the master cylinder according to the step force of the driver.

Referring to FIGS. 2A and 2B, the hybrid EMB 100 includes a spindle 122 rotating by the motor clamping force at the time of actuating the actuator 120. A primary piston 130 linearly moves to advance or retreat in the housing 110 when the spindle 122 rotates. A secondary piston 140 is mounted between the primary piston 130 and the housing 110, positioned on an outer periphery of the primary piston 130, and contacts an inner pad 162 in a brake pad 160.

The actuator 120 includes a motor and a decelerator (not shown) and generates a motor torque (motor clamping force) for generating an initial brake force. Here, the spindle 122 transfers the torque generated from the motor of the actuator 120 to the primary piston 130.

The primary piston 130 linearly moves forward and backward by the motor torque (motor clamping force) of the actuator 120 transferred through the joined spindle 122 to increase a pressure in a hydraulic chamber 142 between the primary piston 130 and the secondary piston 140 at the time of moving forward toward the secondary piston 140.

A guide 132 is disposed between the primary piston 130 and the secondary piston 140 to convert a rotating motion of the spindle 122 into a linear motion of the primary piston 130 and is mounted at one side of the actuator 120. The guide 132 guides the linear motion of the secondary piston 140 positioned between the housing 110 and the guide 132.

The secondary piston 140 linearly moves between the primary piston 130 and the housing 110 to form the hydraulic chamber 142 between the secondary piston 140 and the primary piston 130, and closely pressurizes the inner pad 162 of the brake pad 160 to a brake disk 170 when the secondary piston 140 moves forward by pushing (force to advance by receiving the motor clamping force of the actuator 120 through the spindle 122) of the primary piston 130 and by the hydraulic pressure of the hydraulic chamber 142 increased when the primary piston 130 moves forward.

In other words, the secondary piston 140 transfers the motor clamping force, that is, the brake force amplified in the relationship between the primary piston 130 and a brake oil in the hydraulic chamber 142 to the brake pad 160.

The brake pad 160 compresses the disk 170 (a disk that is rotating or stopped) through the brake force (amplified motor clamping force) transferred by the secondary piston 140 to stop the vehicle.

In this case, the housing 110 supports an outer pad 164 of the brake pad 160 to transfer the brake force to the outer pad 164.

The hydraulic chamber 142 is maintained to be airtight by a primary piston seal 134 and a secondary piston seal 144 to enable formation and maintenance of the hydraulic pressure and enable a hydraulic booting force by the primary piston 130.

The primary piston seal 134 is provided on an outer peripheral surface of the primary piston 130 to maintain sealing of the primary piston 130 between the guide 132 and the primary piston 130. The secondary piston seal 144 is provided on an outer peripheral surface of the secondary piston 140 to maintain sealing of the secondary piston 140 between the housing 110 and the secondary piston 140.

The hybrid EMB 100 of the present disclosure increases the pressure by the hydraulic pressure of the hydraulic chamber 142 in proportion to an area ratio of the primary piston 130 and the secondary piston 140 at the time of actuating the actuator 120.

In detail, the brake force transferred to the brake pad 160 in the hybrid EMB 100 as compared with the initial brake force by the motor clamping force of the actuator 120 by the hydraulic force by an area ratio of a front end (a portion detachable from the secondary piston 140) and a front end (a portion contacting the brake pad 160) of the secondary piston 140, and thus, a brake force applicable even to a large-sized vehicle may be secured, and in this case, the brake force may be calculated by Equation 1 given below.

$$\text{Brake force} = \text{pressure of hydraulic chamber} * \text{area of front end of secondary piston} = (\text{motor clamping force of actuator}/\text{area of front end of primary piston}) * \text{area of front end of secondary piston} = \text{motor clamping force of actuator} * (\text{area of front end of secondary piston}/\text{area of front end of primary piston})$$

Equation 1:

In the hybrid EMB 100, clamping force boosted by the actuator 120 is secondarily boosted by the brake oil between the primary piston 130 and the secondary piston 140 before transferring to the brake pad 160 by the primary piston 130. The resulting final boosted clamping force (brake force) is transferred to the brake pad 160 to brake the vehicle in a main brake mode and the hydraulic pressure between the primary piston 130 and the secondary piston 140 is removed by opening the hydraulic chamber 142 (FIG. 2A). Then, the clamping force generated by the actuator 120 is transferred to the brake pad 160 by the primary piston 130 and the secondary piston 140 by contacting the primary piston 130 and the secondary piston 140 each other to brake the vehicle, and as a result, the vehicle parks in a parking brake mode (FIG. 2B).

In the hybrid EMB 100, a constant predetermined clearance needs to be secured between the primary piston 130 and the secondary piston 140 in order to secure stable brake performance when the parking brake mode is terminated (cancelled) and switched to the main brake mode again and in this case, continuous residual compression occurs between the secondary piston 140 and the brake pad 160 due to dissatisfaction of the hydraulic pressure formed between the primary piston 130 and the secondary piston 140, and as a result, driving performance deteriorates and the driver may feel the brake sense of difference due to a vehicle brake cancellation fault.

Figure 3:
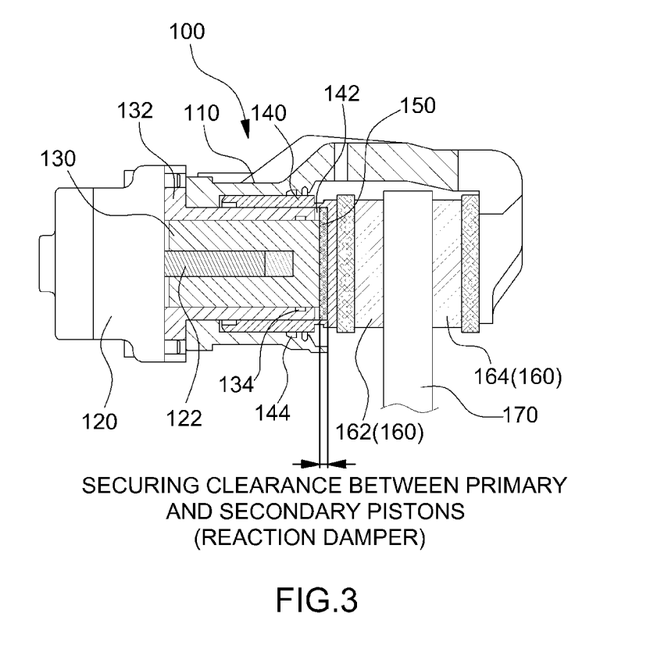
FIG. 3 is a configuration diagram illustrating a hybrid EMB having a reaction damper according to an embodiment of the present inventive concept.

Accordingly, as illustrated in the embodiment of FIG. 3, a reaction damper 150, which transfers the pressure of the hydraulic chamber by the hydraulic pressure of the brake oil and the motor clamping force between the primary piston 130 and the secondary piston 140, may be installed inside the front end of the secondary piston 140.

Figure 4A:
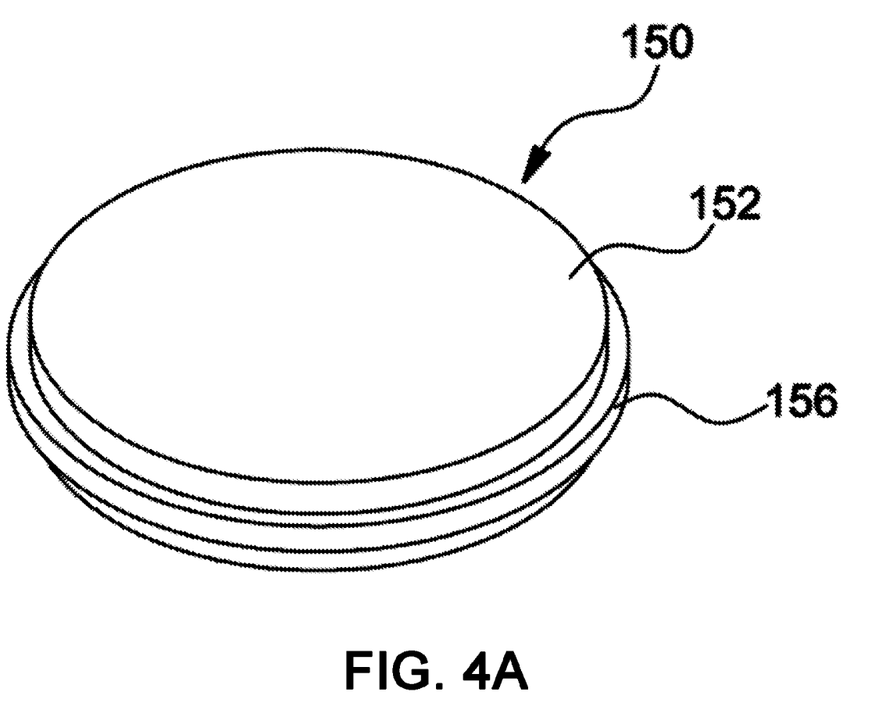
FIG. 4A is a diagram illustrating a reaction damper of a hybrid EMB according to an embodiment of the present inventive concept.
Figure 4B:
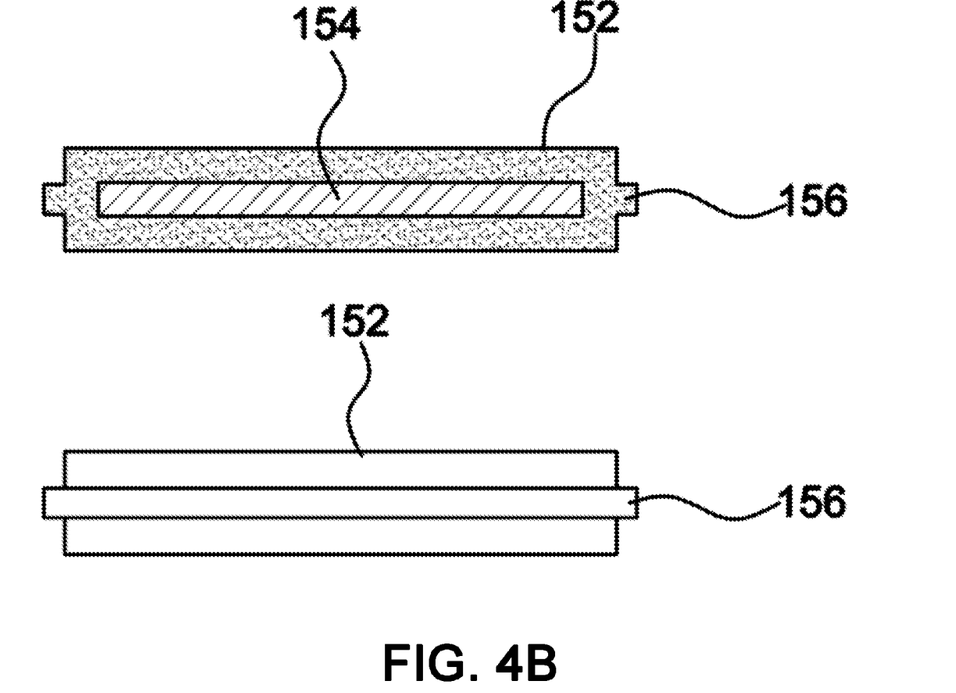
FIG. 4B is cross-sectional views of FIG. 4A.

Referring to FIGS. 4A and 4B, the reaction damper 150 includes the external outer member 152 and the internal inner member 154 in order to support a load by the motor clamping force and the pressure of the hydraulic chamber. The external outer member 152 is made of rubber in order to switch the motor clamping force into the pressure by the hydraulic pressure of the hydraulic chamber while the primary piston 130 advances to the secondary piston 140 and the inner member 154 is made of steel in order to prevent excessive deformation of the reaction damper 150 in the external outer member 152 and stably transfer the parking brake force.

In the reaction damper 150, in order to increase mountability and maintain a mounting location in the secondary piston 140, a joining protrusion 156 is inserted and fixed into an inner wall surface of the front end of the secondary piston 140 and protrudes on an outer peripheral surface of the external outer member 152. In this case, the joining protrusion 156 may have a ring shape along an outer peripheral surface of the reaction damper 150.

As described above, the reaction damper 150 disposed between the primary piston 130 and the secondary piston 140 performs a function of the hydraulic pressure by the brake oil in the hydraulic chamber by elasticity of the external outer member 152 and enables normal entrance into the main brake mode after canceling the parking brake mode by maintaining a predetermined clearance between the primary piston 130 and the secondary piston 140 that contact each other at the time of switching the parking brake mode into the main brake mode.

As a result, a decrease in durability due to deterioration among the respective components of the hybrid EMB 100 may be prevented and the brake sense of difference felt by the driver at the time of changing the brake mode may be enhanced.

In the hybrid EMB 100 having the reaction damper 150, the motor clamping force generated by the actuator 120 is transferred to the reaction damper 150 through the primary piston 130 in the main brake mode. In this case, while the reaction damper 150 is pressed (compressed), the pressure is generated in the hydraulic chamber. In the main brake mode, the brake force as a force of the reaction damper 150 pushes the secondary piston 140, which is a resultant force by the motor clamping force by the actuator 120 and the pressure generated in the hydraulic chamber 142.

In the hybrid EMB 100, the reaction damper 150 directly transfers the motor clamping force to the secondary piston 140 even in the parking brake mode. In the parking brake mode, since the primary and secondary pistons 130 and 140 are directly connected with (contact) the reaction damper 150 while the hydraulic pressure in the hydraulic chamber 142 between the primary piston 130 and the secondary piston 140 is removed, the brake force is easily transferred and generated and when the parking brake mode terminates and the parking brake mode is switched into the main brake mode. Thus, the clearance (the clearance between the primary piston and the secondary piston) is secured through without additionally retreating the primary piston 130 to prevent a resulting time delay and the decrease in durability of the piston seal when the mode is switched.

Accordingly, the hybrid EMB system of the present disclosure may be realized, which is resistant to the decrease in durability while enhancing the problem and maintaining the performance effect of the hybrid EMB in the related art.

In detail, in the main brake mode and the parking brake mode, a procedure for resecuring a predetermined clearance between the pistons 130 and 140 is omitted, and as a result, occurrence of the time delay is removed. Accordingly, when the brake modes are changed to each other, stable brake performance may be realized without the brake sense of difference. A factor which may cause deterioration of responsiveness control related precision of an entire brake system is removed through removing the time delay, and as a result, deterioration durability performance may be maximized, thereby securing control stability. When the brake mode is changed, unnecessary drag occurrence is suppressed to remove a fuel efficiency deterioration cause.

Figure 5:
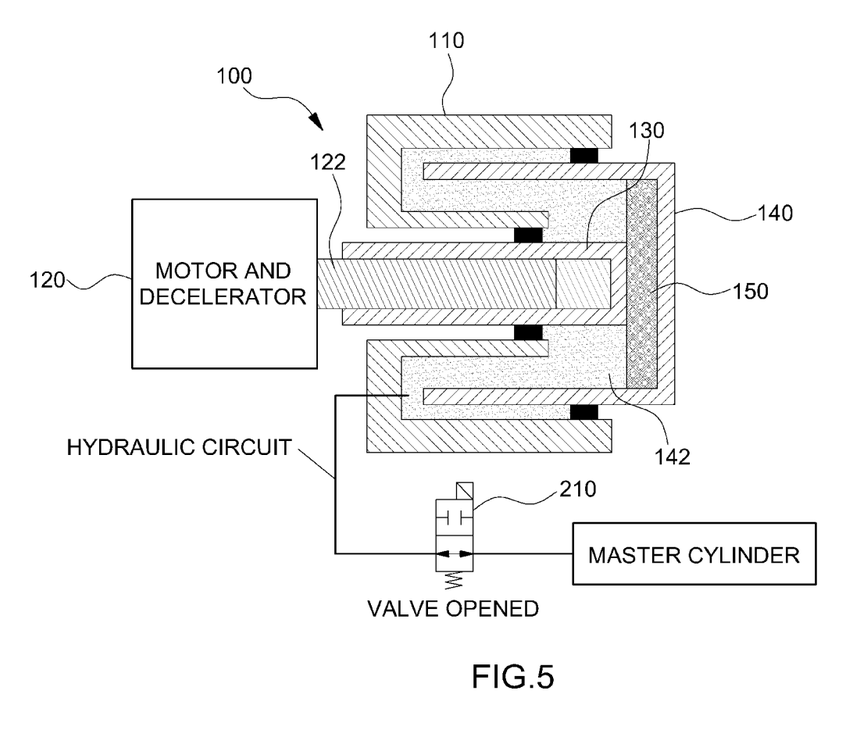
FIG. 5 is a diagram for describing an initial state of a hybrid EMB according to an embodiment of the present inventive concept.
Figure 6:
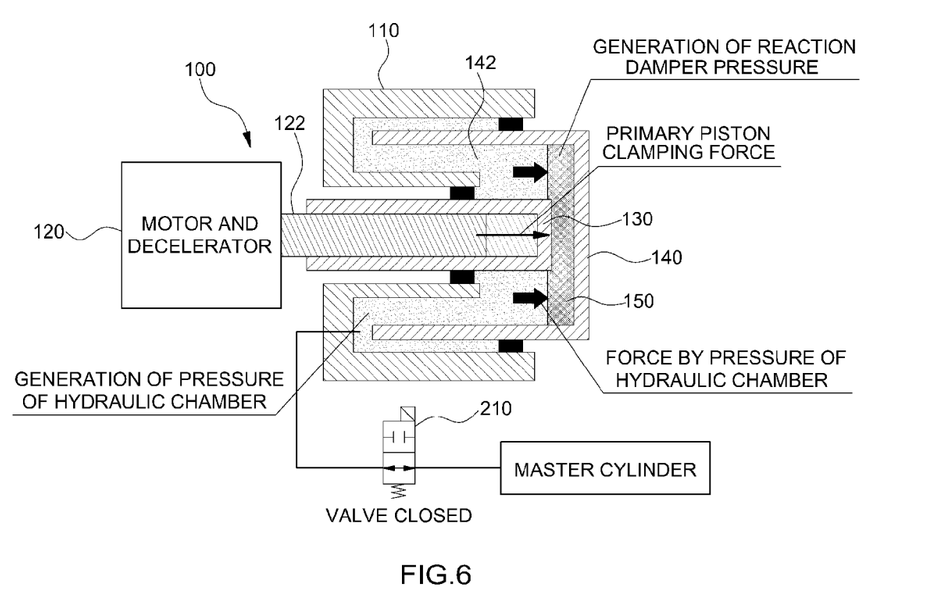
FIG. 6 is a diagram for describing an actuation mechanism in a main brake mode of a hybrid EMB according to an embodiment of the present inventive concept.
Figure 7:
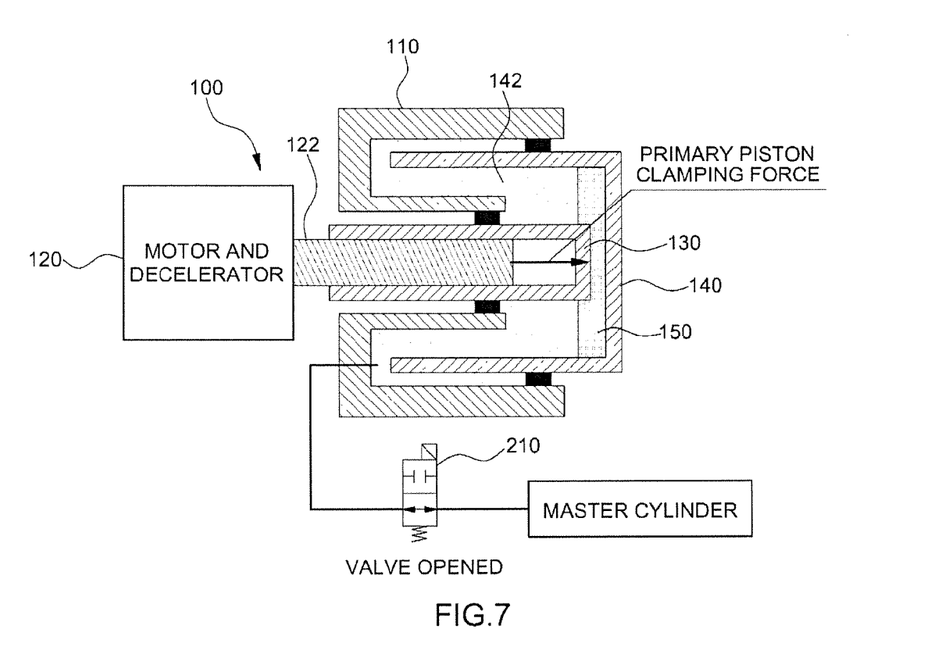
FIG. 7 is a diagram for describing an actuation mechanism in a parking brake mode of a hybrid EMB according to an embodiment of the present inventive concept.

FIG. 5 illustrates a structure for describing an initial state of a hybrid EMB system. FIG. 6 illustrates a structure for describing an actuation mechanism in a main brake mode of a hybrid EMB system. FIG. 7 illustrates a structure for describing an actuation mechanism in a parking brake mode of a hybrid EMB system.

Referring to FIG. 5 in an initial state before braking, in the hydraulic chamber 142 of the hybrid EMB 100, a solenoid valve 210 is open to form an opened space, and a clearance between the primary piston 130 and the secondary piston 140 is formed with the thickness of the reaction damper 150 or more. In the initial state, the primary piston 130 and the reaction damper 150 may contact or not contact each other.

Referring to FIG. 6, in the main brake mode, the solenoid valve 210 is closed to form a closed space and while the primary piston 130 moves forward while the primary piston 130 contacts the reaction damper 150 in the hydraulic chamber 142 of the hybrid EMB 100, and the clamping force of the primary piston 130 is switched into the pressure in the hydraulic chamber. Therefore, the pressure in the hydraulic chamber is formed by the clamping force (the motor clamping force transferred through the spindle 122) of the primary piston 130 before contacting the reaction damper 150 and the pressure in the hydraulic chamber is increased while the reaction damper 150 is deformed by the clamping force of the primary piston 130 after the primary piston 130 contacts the reaction damper 150. Thus, the brake force of the secondary piston 140 is generated by the force (the resultant force of the clamping force by the actuator and the pressure by the hydraulic chamber) of the reaction damper 150 to that pushes the secondary piston 140.

In the main brake mode, the reaction damper 150 acts like a non-compressible fluid to form the pressure in the hydraulic chamber 142 and transfers the formed pressure to the secondary piston 140, and thus, the brake force is the resultant force of the brake force by the hydraulic pressure and the clamping force (motor torque).

Referring to FIG. 7, in the parking brake mode, the solenoid valve 210 is open to form the opened space and since the primary piston 130 and the reaction damper 150 and the secondary piston 140 contact each other in parking in the hydraulic chamber 142 of the hybrid EMB 100, the motor clamping force of the actuator 120 is just transferred to pressurize the reaction damper 150 to push the secondary piston 140, thus generating the brake force of the secondary piston 140.

The inventive concept has been described in detail with reference to embodiments thereof. However, it will be appreciated by those skilled in the art that changes may be made in these embodiments without departing from the principles and spirit of the disclosure, the scope of which is defined in the appended claims and their equivalents.

What is claimed is:

1. A hybrid electro-mechanical brake (EMB), comprising:
an actuator mounted at one side of a housing and generating a motor clamping force;
a primary piston connected to a spindle, in which the spindle rotates by a motor clamping force of the actuator and the primary piston linearly moves when the spindle rotates;
a secondary piston linearly moving and mounted between the housing and the primary piston to form a hydraulic chamber between the second piston and the primary piston; and
a reaction damper disposed inside the secondary piston at a front end of the secondary piston between the primary piston and the secondary piston and transferring the motor clamping force and a hydraulic pressure in the hydraulic chamber,
wherein the motor clamping force of the actuator and the hydraulic pressure in a hydraulic chamber generate a brake force,
wherein the actuator actuates to move the primary piston toward the front end of the secondary piston to increase the hydraulic pressure in the hydraulic chamber which is sealed, so that the brake force transferred to the secondary piston increases, and
wherein the reaction damper includes:
an external outer member made of rubber so that when the primary piston moves toward the secondary piston, the motor clamping force is converted into the hydraulic pressure in the hydraulic chamber by elasticity; and
an internal inner member made of steel to prevent excessive deformation of the reaction damper.

2. The hybrid EMB of claim 1, wherein the brake force transferred to the secondary piston is proportional to an area ratio of the primary piston and the secondary piston and is calculated by the following equation:

motor clamping force of actuator×(area of front end of secondary piston/area of front end of primary piston).

3. The hybrid EMB of claim 1, wherein the reaction damper includes a joining protrusion inserted and fixed into an inner wall surface of the front end of the secondary piston,
wherein the joining protrusion protrudes on an outer peripheral surface of the external outer member to increase mountability in the secondary piston, and
wherein the external outer member is made of rubber, so that the motor clamping force is switched into the hydraulic pressure in the hydraulic chamber when the primary piston moves toward the secondary piston.

4. The hybrid EMB of claim 1, further comprising:
a guide mounted at one side of the actuator and disposed between the primary piston and the secondary piston such that when a threaded connection of the spindle and the primary piston converts the rotating motion of the spindle into a linear motion of the primary piston, the guide guides the linear motion of the secondary piston.

5. A hybrid EMB system, comprising:
a hybrid EMB generating a brake force together with a hydraulic apparatus;
a wheel control unit (WCU) configured to control the hybrid EMB; and
a solenoid valve opening and closing a hydraulic line between the hydraulic apparatus and the hybrid,
wherein the hybrid EMB includes:
an actuator mounted at one side of a housing and generating a motor clamping force;

a primary piston connected to a spindle, in which the spindle rotates by the motor clamping force of the actuator and the primary piston linearly moves when the spindle rotates;

a secondary piston linearly moving and mounted between the housing and the primary piston to form a hydraulic chamber between the second piston and the primary piston; and a reaction damper disposed inside the secondary piston at a front end thereof between the primary piston and the secondary piston and transferring the motor clamping force and a hydraulic pressure in the hydraulic chamber, wherein the reaction damper includes:

an external outer member made of rubber so that when the primary piston moves toward the secondary piston, the motor clamping force is converted into the hydraulic pressure in the hydraulic chamber by elasticity; and an internal inner member made of steel to prevent excessive deformation of the reaction damper.

* * * * *